(12) United States Patent
Suh et al.

(10) Patent No.: US 7,675,841 B2
(45) Date of Patent: Mar. 9, 2010

(54) APPARATUS AND METHOD FOR GENERATING A PREAMBLE SEQUENCE IN AN ORTHOGONAL FREQUENCY DIVISION MULTIPLEXING COMMUNICATION SYSTEM

(75) Inventors: Chang-Ho Suh, Seoul (KR); Chan-Soo Hwang, Yongin-si (KR); Hyeon-Woo Lee, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 825 days.

(21) Appl. No.: 10/993,113

(22) Filed: Nov. 19, 2004

(65) Prior Publication Data

US 2005/0105460 A1 May 19, 2005

(30) Foreign Application Priority Data

Nov. 19, 2003 (KR) ............... 10-2003-0082252

(51) Int. Cl.
*H04J 11/00* (2006.01)
(52) U.S. Cl. .............. 370/203; 370/208; 370/215
(58) Field of Classification Search ......... 370/203–211, 370/212, 215, 328, 330, 343, 344; 375/130, 375/260
See application file for complete search history.

(56) References Cited

U.S. PATENT DOCUMENTS

| | | | | |
|---|---|---|---|---|
| 6,658,063 B1 * | 12/2003 | Mizoguchi et al. | .......... | 375/260 |
| 6,738,443 B1 | 5/2004 | Bohnke et al. | | |
| 7,233,625 B2 * | 6/2007 | Ma et al. | ................ | 370/330 |
| 7,388,920 B2 * | 6/2008 | Nam et al. | ................ | 370/208 |
| 2001/0028637 A1 * | 10/2001 | Abeta et al. | ............... | 370/335 |
| 2002/0122381 A1 * | 9/2002 | Wu et al. | ................ | 370/208 |
| 2003/0103584 A1 * | 6/2003 | Bjerke et al. | ............. | 375/340 |
| 2004/0047284 A1 * | 3/2004 | Eidson | ................ | 370/203 |
| 2004/0086027 A1 * | 5/2004 | Shattil | ................ | 370/208 |
| 2004/0114504 A1 * | 6/2004 | Jung et al. | ............... | 370/203 |
| 2004/0162021 A1 * | 8/2004 | Seki et al. | ................ | 455/39 |
| 2004/0208523 A1 | 10/2004 | Carrick et al. | | |
| 2005/0105460 A1 * | 5/2005 | Suh et al. | ................ | 370/203 |
| 2005/0249319 A1 * | 11/2005 | Suh et al. | ................ | 375/347 |
| 2005/0281316 A1 * | 12/2005 | Jang et al. | ................ | 375/130 |

FOREIGN PATENT DOCUMENTS

| | | |
|---|---|---|
| JP | 2000-068973 | 3/2000 |
| KR | 1020010007391 | 1/2001 |
| KR | 1020030035843 | 5/2003 |

* cited by examiner

*Primary Examiner*—Ricky Ngo
*Assistant Examiner*—Phuongchau B Nguyen
(74) *Attorney, Agent, or Firm*—The Farrell Law Firm, LLP

(57) ABSTRACT

Disclosed are an apparatus and a method for generating a preamble sequence in an orthogonal frequency division multiplexing communication system including a reference base station and a plurality of non-reference base stations and employing m sub-carriers in a frequency domain. A reference preamble sequence having a length equal to n is generated and mapped on a one-to-one basis with n sub-carriers of the m sub-carriers. A final preamble sequence equivalent to the reference preamble sequence is generated when the base station is a reference base station, or a phase of the reference preamble sequence is shifted by a predetermined phase in order to generate a phase-shifted final preamble sequence when the base station is a non-reference base station, thereby minimizing interference between neighbor base stations.

8 Claims, 10 Drawing Sheets $$\begin{bmatrix} Y_0 \\ Y_1 \\ \vdots \\ Y_{A-1} \end{bmatrix} = \begin{bmatrix} 1 & 0 & \cdots & 0 \\ 0 & e^{j\frac{2\pi L}{A}} & \cdots & 0 \\ \vdots & \vdots & \ddots & \vdots \\ 0 & 0 & \cdots & e^{j\frac{2\pi(A-1)L}{A}} \end{bmatrix} \begin{bmatrix} X_0 \\ X_1 \\ \vdots \\ X_{A-1} \end{bmatrix}$$

L-PHASE CONVERTER

FIG.7

$$\begin{bmatrix} Y_0 \\ Y_1 \\ \vdots \\ Y_{127} \end{bmatrix} = \begin{bmatrix} 1 & 0 & \cdots & 0 \\ 0 & e^{j\frac{2\pi \times 1 \times 32}{128}} & \cdots & 0 \\ \vdots & \vdots & \ddots & \vdots \\ 0 & 0 & \cdots & e^{j\frac{2\pi \times 127 \times 32}{128}} \end{bmatrix} \begin{bmatrix} X_0 \\ X_1 \\ \vdots \\ X_{A-1} \end{bmatrix}$$

L-PHASE CONVERTER input: $X_0, X_1, \cdots X_{127}$ output: $Y_0, Y_1, \cdots Y_{127}$

FIG.9

APPARATUS AND METHOD FOR GENERATING A PREAMBLE SEQUENCE IN AN ORTHOGONAL FREQUENCY DIVISION MULTIPLEXING COMMUNICATION SYSTEM

PRIORITY

This application claims priority to an application entitled "Apparatus And Method For Generating A Preamble Sequence In An Orthogonal Frequency Division Multiplexing Communication System" filed with the Korean Intellectual Property Office on Nov. 19, 2003 and assigned Serial No. 2003-82252, the contents of which are incorporated herein by reference.

BACKGROUND OF THE INVENTION

1. Field of the Invention

The present invention relates to an OFDM (Orthogonal Frequency Division Multiplexing) communication system, and more particularly to an apparatus and a method for generating a preamble sequence for minimizing the interference between neighbor cells in an OFDM communication system.

2. Description of the Related Art

Generally, a wireless communication system includes a Node B and user equipment (UE) in order to provide users with wireless communication services. The Node B and the UE support the wireless communication services by using transmission frames. Accordingly, the Node B and the UE must obtain mutual synchronization for transmitting and receiving the transmission frames. To this end, the Node B transmits a synchronizing signal to the UE to allow the UE to recognize a start point of the frame transmission. Upon receiving the synchronizing signal from the Node B, the UE checks the frame timing of the Node B and demodulates the transmission frames received therein according to the frame timing. In general, a preamble sequence, which is preset between the Node B and the UE, is used as a synchronizing signal.

In addition, a preamble sequence used in an OFDM communication system must have a low peak to average power ratio (PAPR). A long preamble sequence is transmitted to the UE from the Node B. The long preamble sequence includes a preamble sequence required for coarse synchronization and a short preamble sequence required for micro frequency synchronization. In addition, the short preamble sequence is transmitted to the Node B from the UE so as to obtain the micro frequency synchronization. The following examples described why the preamble sequence of the OFDM communication system must have a low PAPR. First, the OFDM communication system is a multi carrier communication system employing a plurality of carriers, that is, a plurality of sub-carriers, so orthogonality of the sub-carriers becomes an important factor. Thus, each sub-carrier has its own phase such that the sub-carriers are orthogonal to each other. If the phase is changed during the sub-carrier transmission/reception procedure, the sub-carriers may overlap with each other. In this case, the overlapped sub-carriers may deviate from a linear interval of an amplifier provided in the OFDM communication system, so a normal signal transceiving operation is impossible. For this reason, the OFDM communication system uses the preamble sequence having a minimized PAPR.

The OFDM communication system transmits data to various UEs by time-multiplexing one frame. In addition, the OFDM communication system transmits a frame preamble sequence for a predetermined interval from a start point of the frame in order to indicate the beginning of the frame transmission. Since data to be transmitted to each UE may be irregularly included in one frame, a burst preamble sequence indicating a start of the data may be transmitted prior to the transmission of each data. Accordingly, the UE must receive a data preamble sequence in order to recognize the start point of the data transmission. That is, the UE must synchronize with the start point of data transmission in order to receive the data, so the UE needs to be synchronized with the preamble sequence commonly used in the OFDM communication system before receiving a signal.

In the meantime, a source coding scheme, a channel coding scheme and a modulation scheme of the OFDM communication system are identical to those of communication systems which do not employ the OFDM scheme. A Code Division Multiple Access (CDMA) communication system transmits data by spreading the data. However, the OFDM communication system transmits data after performing Inverse Fast Fourier Transform (IFFT) with regard to the data and inserting a guard interval signal into the data. Thus, different from the CDMA communication system, the OFDM communication system can transmit broadband signals with a relatively simple hardware structure. The OFDM communication system combines a plurality of bit/symbol arrays after modulating data and inputs parallel bit/symbol arrays into an IFFT unit corresponding to a frequency domain, thereby outputting IFFT time domain signals. The IFFT time domain signal is obtained by multiplexing a broadband signal into a plurality of narrow band sub-carrier signals. In addition, a plurality of modulation symbols are transmitted through the IFFT procedure during one OFDM symbol interval.

If the above IFFT OFDM symbols are transmitted in the OFDM communication system, interference may occur between previously-transmitted OFDM symbols and currently-transmitted OFDM symbols. In order to avoid the interference between the OFDM symbols, the guard interval signal is inserted into the data. The guard interval signal can be created through a "cyclic prefix" scheme, in which predetermined number end samples of the OFDM symbols in the time domain are copied and inserted into effective OFDM symbols, or a "cyclic postfix" scheme, in which predetermined number of beginning samples of the OFDM symbols in the time domain are copied and inserted into effective OFDM symbols. Sizes of the beginning and end samples used in the cyclic prefix scheme and the cyclic postfix scheme are predetermined in the OFDM communication system. A receiver can time-frequency synchronize the OFDM symbols by using the characteristics of the guard interval signals, which are created by inserting the copied beginning or end parts of the OFDM symbols into the effective OFDM symbols.

A transmission signal from a transmitter becomes distorted while passing through a wireless channel environment, and the receiver may receive the distorted transmission signal. Upon receiving the distorted transmission signal from the transmitter, the receiver obtains time-frequency synchronization by using a preamble sequence, which is preset between the transmitter and the receiver, and performs channel estimation. After that, the signals are demodulated into frequency domain symbols through fast Fourier transform (FFT). Then, the receiver performs a channel decoding process and a source decoding process, which correspond to the channel coding in the transmitter, with regard to the demodulated symbols, thereby decoding the symbols into information data.

The OFDM communication system employs the preamble sequence when performing the frame timing synchronization, frequency synchronization and channel estimation. It is also possible for the OFDM communication system to perform the frame timing synchronization, frequency synchronization and channel estimation by using the guard interval and pilot sub-carriers instead of the preamble sequence. When the preamble sequence is employed, known symbols are transmitted with every frame or at a start point of a data burst. At this time, estimated time-frequency-channel information is used for updating transmission data by using information related to guard interval signals and sub-carriers.

Hereinafter, a preamble sequence structure employed in a conventional OFDM communication system will be described with reference to FIGS. 1 and 2.

FIG. 1 is a diagram showing a structure of a long preamble sequence used in the conventional OFDM communication system. The current OFDM communication system uses the same preamble sequence in a down link (DL) and an up link (UL). Referring to FIG. 1, the long preamble sequence includes four 64-length sequences and two 128-length sequences. According to the characteristic of the OFDM communication system, the cyclic prefix is added in front of the four 64-length sequences and in front of the two 128-length sequences. In addition, the signals before the IFFT are frequency domain signals and the signals after the IFFT are time domain signals. The long preamble sequence shown in FIG. 1 is a time domain long preamble sequence obtained after the IFFT has been carried out.

In addition, the long preamble sequence in a frequency domain before the IFFT is represented as follows:

$S(-100:100) =$ $\{+1+j, 0, 0, 0, +1+j, 0, 0, 0, +1+j, 0, 0, 0, +1-j, 0, 0, 0, -$ $1+j, 0, 0, 0, +1+j, 0, 0, 0, +1+j, 0, 0, 0, +1+j, 0, 0, 0, +$ $1-j, 0, 0, 0, -1+j, 0, 0, 0, +1+j, 0, 0, 0, +1+j, 0, 0, 0, +$ $1+j, 0, 0, 0, +1-j, 0, 0, 0, -1+j, 0, 0, 0, +1-j, 0, 0, 0, +$ $1-j, 0, 0, 0, +1-j, 0, 0, 0, -1-j, 0, 0, 0, +1+j, 0, 0, 0, -$ $1+j, 0, 0, 0, -1+j, 0, 0, 0, -1+j, 0, 0, 0, +1+j, 0, 0, 0, -$ $1-j, 0, 0, 0,$ $0, 0, 0, 0, -$ $1-j, 0, 0, 0, +1-j, 0, 0, 0, +1+j, 0, 0, 0, -1-j, 0, 0, 0, -$ $1+j, 0, 0, 0, +1-j, 0, 0, 0, +1+j, 0, 0, 0, -1+j, 0, 0, 0, +$ $1-j, 0, 0, 0, -1-j, 0, 0, 0, +1+j, 0, 0, 0, -1+j, 0, 0, 0, -$ $1-j, 0, 0, 0, +1+j, 0, 0, 0, +1-j, 0, 0, 0, -1-j, 0, 0, 0, +$ $1-j, 0, 0, 0, +1-+, 0, 0, 0, -1-j, 0, 0, 0, -1+j, 0, 0, 0, -$ $1+j, 0, 0, 0, -1-j, 0, 0, 0, +1-j, 0, 0, 0, -1+j, 0, 0, 0, +$ $1+j\} * sqrt(2) * sqrt(2)$ $P(-100:100) =$ $\{-1, 0, +1, 0, +1, 0, +1, 0, +1, 0, -1, 0-1, 0, +1, 0, -1, 0+1, 0, -$ $1, 0, -1, 0, +1, 0, +1, 0, -1, 0, +1, 0-1, 0, +1, 0, -1, 0, +1, 0, -$ $1, 0, +1, 0, +1, 0, -1, 0, +1, 0, -1, 0-1, 0, +1, 0, -1, 0-1, 0, -$ $1, 0, +1, 0, +1, 0, -1, 0, +1, 0, +1, 0+1, 0, -1, 0, +1, 0+1, 0, -$ $1, 0, -1, 0, -1, 0, +1, 0, +1, 0, +1, 0+1, 0, +1, 0, +1, 0+1, 0,$ $0, 0 -$ -continued $1, 0, -1, 0, +1, 0, -1, 0, -1, 0, +1, 0+1, 0, +1, 0, -1, 0, +1, 0, +$ $1, 0, +1, 0, -1, 0, -1, 0, -1, 0, -1, 0-1, 0, -1, 0, +1, 0, -1, 0, -$ $1, 0, -1, 0, -1, 0, -1, 0, -1, 0, +1, 0+1, 0, +1, 0, -1, 0, +1, 0, -$ $1, 0, +1, 0, +1, 0, -1, 0, +1, 0, +1, 0+1, 0, -1, 0, -1, 0, -1, 0, -$ $1, 0, -1, 0, +1, 0, -1, 0, -1, 0, +1, 0-1, 0, -1, 0, +1, 0, -1\} * sqrt(2) *$ $sqrt(2)$ In the above long preamble sequence of the frequency domain, the numbers shown in S(−100:100) and P(−100:100) represent positions of sub-carriers employed when performing the IFFT, which will be described later with reference to FIG. 3. S(−100:100) represents a frequency domain sequence including four 64-length sequences and P(−100:100) represents a frequency domain sequence including two 128-length sequences. In S(−100:100) and P(−100:100), sqrt(2) signifies root 2, and sqrt(2)*sqrt(2) signifies two-step amplification for increasing the transmit power of S(−100:100) and P(−100:100).

A structure of a short preamble sequence will be described with reference to FIG. 2.

FIG. 2 is a diagram showing a structure of a short preamble sequence of a conventional OFDM communication system. Referring to FIG. 2, the short preamble sequence includes two 128-length sequences. The cyclic prefix is added in front of the two 128-length sequences. In addition, the short preamble sequence shown in FIG. 2 is a time domain short preamble sequence after the IFFT. P(−100:100) is a frequency domain short preamble sequence.

The long preamble sequence must be created by taking the following factors into consideration.

(1) Low PAPR

In order to maximize the transmission rate of a power amplifier provided at a transmission terminal of a transmitter of an OFDM communication system, the OFDM symbol must have a low PAPR. As mentioned above, after the IFFT has been performed with regard to the signal, the signal is input into a power transmitter. At this time, since the power transmitter has a non-linear characteristic, the low PAPR is required. That is, it is necessary for the time domain OFDM symbol corresponding to an IFFT output terminal to have a low PAPR, and the OFDM symbols must have uniform distribution so as to minimize the PAPR. In other words, if symbols having a low cross correlation are provided in an IFFT input terminal of a transmitter, that is, in the frequency domain, the PAPR can be reduced.

(2) Parameter estimation required for communication initialization

Parameter estimation includes channel estimation, frequency offset estimation, and time offset estimation.

(3) Low complexity and overhead (4) Coarse frequency offset estimation

The long preamble sequence created by taking the above factors into consideration has the following functions.

(1) The long preamble sequence including the four 64-length sequences is used for time offset estimation and coarse frequency offset estimation.

(2) The long preamble sequence including the two 128-length sequences is used for micro frequency offset and channel estimation.

The long preamble sequence is used in the OFDM communication system for the purpose of following objects.

(1) A first preamble sequence of a forward PDU (protocol data unit)
(2) Initial ranging
(3) Bandwidth request ranging In addition, the short preamble sequence is used in the OFDM communication system for the purpose of following objects.

(1) Backward data preamble sequence
(2) Periodic ranging

Since the OFDM communication system can obtain precise synchronization by performing initial ranging and periodic ranging, the backward data preamble sequence is mainly used for the purpose of channel estimation. The PAPR, performance and complexity must be considered when performing the channel estimation. In a case of a short preamble sequence, the PAPR is 3.5805dB, and various channel estimation algorithms including minimum mean square error (MMSE) and least square (LS) can be used.

A mapping relationship between the sub-carriers and the preamble sequence when performing the IFFT in the conventional OFDM communication system will be described with reference to FIG. 3.

FIG. 3 is a diagram illustrating a mapping relationship between sub-carriers and the preamble sequence when performing the IFFT in the conventional OFDM communication system.

Referring to FIG. 3, the OFDM communication system employs 256 sub-carriers including #−128 to #127 sub-carriers, and 200 sub-carriers including #−100 to #100 sub-carriers are actually used. In FIG. 3, numbers shown at a front of an IFFT unit represent frequency components, that is, the numbers of the sub-carriers. Herein, from among the 256 sub-carriers, 200 sub-carriers except for a #0 sub-carrier, #−128 to #−101 sub-carriers, and #101 to #127 sub-carriers are actually used. When the #0 sub-carrier, #−128 to #−101 sub-carriers, and #101 to #127 sub-carriers are transmitted, null data (that is, zero data) is inserted into the sub-carriers due to following reasons. First, the null data are inserted into the $0^{th}$ sub-carrier because the #0 sub-carrier represents the DC component at a reference point of the preamble sequence, that is, in a time domain after the IFFT has been carried out. In addition, the null data is inserted into the 28 sub-carriers including #−128 to #−101 sub-carriers and 27 sub-carriers including #101 to #127 sub-carriers in order to insert a guard interval in a frequency domain because the above sub-carriers correspond to a high frequency band in the frequency domain.

Thus, if a frequency domain preamble sequence S(−100:100) or P(−100:100) is input into the IFFT unit, the IFFT unit maps the frequency domain preamble sequence S(−100:100) or P(−100:100) into corresponding sub-carriers and performs IFFT, thereby outputting a time domain preamble sequence.

A structure of a transmitter provided in a conventional OFDM communication system will be described with reference to FIG. 4.

FIG. 4 is a block diagram illustrating a structure of a transmitter provided in a conventional OFDM communication system. Referring to FIG. 4, if information bits to be transmitted are generated, the information bits are input into a symbol mapper 411. Upon receiving the information bits, the symbol mapper 411 modulates the information bits into symbols through a predetermined modulation scheme and sends the symbols to a serial to parallel converter 413. The predetermined modulation scheme includes a quadrature phase shift keying (QPSK) scheme and a 16 quadrature amplitude modulation (16QAM) scheme. Upon receiving the symbols from the symbol mapper 411, the serial to parallel converter 413 converts the symbols such that the symbols match with an A-point, which is an input number of an inverse fast Fourier transformer (hereinafter, referred to as IFFT unit) 419 and sends the symbols to a selector 417. In addition, a preamble sequence generator 415 generates preamble sequences under the control of a controller (not shown) and sends the preamble sequences to the selector 417. The selector 417 selects a signal output from the serial-to-parallel converter 413 or a signal output from the preamble sequence generator 415 according to a predetermined scheduling scheme and sends the signal to the IFFT unit 419.

Upon receiving the signal from the selector 417, the IFFT unit 419 performs A-point IFFT with regard to the signal and sends the signal to a parallel-to-serial converter 421. In addition, the parallel-to-serial converter 421 receives a cyclic prefix signal having a predetermined length in addition to the signal output from the IFFT unit 419.

The "cyclic prefix" signal is a guard interval signal. The guard interval signal can be inserted into the data through a "cyclic prefix scheme", in which predetermined number of end samples of the OFDM symbols in the time domain are copied and inserted into effective OFDM symbols, or a "cyclic postfix" scheme, in which predetermined number of beginning samples of the OFDM symbols in the time domain are copied and inserted into effective OFDM symbols. Sizes of the beginning and end samples used in the cyclic prefix scheme and the cyclic postfix scheme are predetermined in the OFDM communication system. In FIG. 4, the guard interval signals are inserted into the data through the cyclic prefix scheme. The parallel-to-serial converter 421 converts the signal output from the IFFT unit 419 and the guard interval signal into serial signals and sends the serial signals to a digital-to-analog converter 423. Upon receiving the serial signals from the parallel-to-serial converter 421, the digital to analog converter 423 converts the serial signals into analog signals and sends the analog signals to an RF (radio frequency) processor 425. The RF processor 425 includes a filter and a front end unit (not shown). The RF processor 425 processes the analog signals output from the digital-to-analog converter 423 such that the signals can be transmitted through air and sends the signals through an antenna.

A preamble sequence and a method for creating the preamble sequence in a conventional OFDM communication system employing N transmit antennas will be described.

In order to estimate the channels of the data transmitted through N transmit antennas in a receiver of the OFDM communication system employing N transmit antennas, it is necessary to transmit preamble sequences through N transmit antennas. However, if at least two antennas are provided in the OFDM communication system, a preamble sequence transmission scheme for estimating the channels of the data transmitted through the transmit antennas has not been yet suggested.

If the preamble sequence is allocated by assigning different sub-carriers to each transmit antenna, the receiver can perform channel estimation only for the sub-carriers assigned for the preamble sequence and cannot perform channel estimation for remaining sub-carriers. Therefore, if at least two transmit antennas are provided, a preamble sequence transmission rule is required for channel estimation with regard to all of the sub-carriers transmitted through the transmit antennas.

In addition, as mentioned above, the OFDM communication system must use a preamble sequence having a low PAPR. Studies and research have been extensively carried out for providing a preamble sequence having a low PAPR in a current OFDM communication system employing one transmit antenna. Similar to the OFDM communication system employing one transmit antenna, the OFDM communication system employing a plurality of transmit antennas must use a preamble sequence having a low PAPR. However, a method for providing the preamble sequence having the low PAPR in the OFDM communication system employing a plurality of transmit antennas has not yet been suggested. Accordingly, it is necessary to provide a method for generating the preamble sequence having low PAPR in the OFDM communication system.

Hereinafter, a preamble sequence and a method for generating the preamble sequence in a cellular OFDM communication system will be described.

First, since the cellular OFDM communication system has a multi-cell structure, all of the Node Bs of the cellular OFDM communication system must transmit the preamble sequence with the same time interval in order to minimize the interference between the neighbor Node Bs. If the Node Bs transmit the preamble sequence with different time intervals, interference between Node Bs may increase, thereby degrading performance of the preamble sequence and deteriorating synchronization and channel estimation performance.

In short, if all of the Node Bs transmit the preamble sequence with the same time interval, interference between the Node Bs can be minimized. Therefore, it is necessary to provide a method for generating the preamble sequence capable of obtaining synchronization and maximizing channel estimation performance by minimizing interference between neighbor Node Bs.

SUMMARY OF THE INVENTION

Accordingly, the present invention has been made to solve at least the above-mentioned problems occurring in the prior art, and an object of the present invention is to provide an apparatus and a method for generating a preamble sequence in a cellular OFDM communication system.

Another object of the present invention is to provide an apparatus and a method for generating a preamble sequence capable of minimizing interference between neighbor cells in a cellular OFDM communication system.

Still another object of the present invention is to provide an apparatus and a method for generating a preamble sequence capable of minimizing interference between neighbor cells in an OFDM communication system having a cellular structure and employing a plurality of transmit antennas.

In order to accomplish these objects, according to a first aspect of the present invention, there is provided a method for generating a preamble sequence in an orthogonal frequency division multiplexing (OFDM) communication system including a reference base station and a plurality of non-reference base stations and employing m sub-carriers in a frequency domain. The method includes generating a reference preamble sequence having a length equal to n and mapped on a one-to-one basis with n sub-carriers of the m sub-carriers and generating a final preamble sequence equivalent to the reference preamble sequence when the base station is a reference base station, or shifting a phase of the reference preamble sequence by a predetermined phase in order to generate a phase-shifted final preamble sequence when the base station is a non-reference base station.

In order to accomplish these objects, according to a second aspect of the present invention, there is provided a method for generating a preamble sequence in an orthogonal frequency division multiplexing (OFDM) communication system including a reference base station and a plurality of non-reference base stations and employing m sub-carriers in a frequency domain and k transmit antennas. The method includes generating a reference preamble sequence having a length equal to m/k and mapped on a one-to-one basis with m/k sub-carriers and generating a final preamble sequence equivalent to the reference preamble sequence when the base station is a reference base station, or shifting a phase of the reference preamble sequence by a predetermined phase in order to generate a phase-shifted final preamble sequence when the base station is a non-reference base station.

In order to accomplish these objects, according to a third aspect of the present invention, there is provided an apparatus for generating a preamble sequence in an orthogonal frequency division multiplexing (OFDM) communication system including a reference base station and a plurality of non-reference base stations and employing m sub-carriers in a frequency domain. The apparatus includes a reference preamble sequence generator for generating a reference preamble sequence having a length equal to n and mapped on a one-to-one basis with n sub-carriers of the m sub-carriers and a phase converter for generating a final preamble sequence equivalent to the reference preamble sequence when the base station is a reference base station, or shifting a phase of the reference preamble sequence by a predetermined phase to allow a base station to generate a phase-shifted final preamble sequence when the base station is a non-reference base station.

In order to accomplish these objects, according to a fourth aspect of the present invention, there is provided an apparatus for generating a preamble sequence in an orthogonal frequency division multiplexing (OFDM) communication system including a reference base station and a plurality of non-reference base stations and employing m sub-carriers in a frequency domain and k transmit antennas. The apparatus includes a reference preamble sequence generator for generating a reference preamble sequence having a length equal to m/k and mapped on a one-to-one basis with m/k sub-carriers and a phase converter for generating a final preamble sequence equivalent to the reference preamble sequence when the base station is a reference base station, or shifting a phase of the reference preamble sequence by a predetermined phase to allow a base station to generate a phase-shifted final preamble sequence when the base station is a non-reference base station.

BRIEF DESCRIPTION OF THE DRAWINGS

The above and other objects, features and advantages of the present invention will be more apparent from the following detailed description taken in conjunction with the accompanying drawings, in which:

FIG. 7 is a block diagram illustrating an internal structure of an L-phase converter shown in FIG. 6;

FIG. 9 is a block diagram illustrating an internal structure of a 32-phase converter shown in FIG. 8;

DETAILED DESCRIPTION OF THE PREFERRED EMBODIMENT

Hereinafter, embodiments of the present invention will be described with reference to the accompanying drawings. In addition, a detailed description of known functions and configurations incorporated herein will be omitted when it may obscure the subject matter of the present invention.

Figure 1:
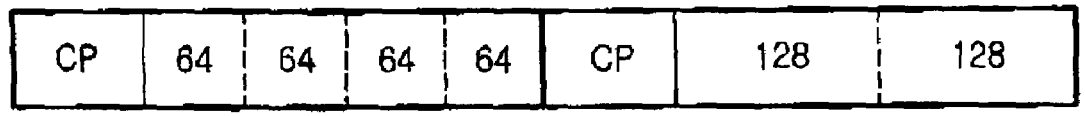
FIG. 1 is a diagram illustrating a structure of a long preamble sequence of a conventional OFDM communication system.
Figure 2:
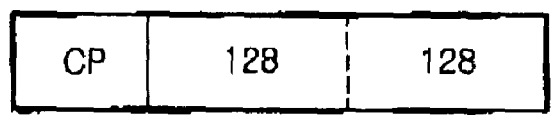
FIG. 2 a diagram illustrating a structure of a short preamble sequence of a conventional OFDM communication system.
Figure 3:
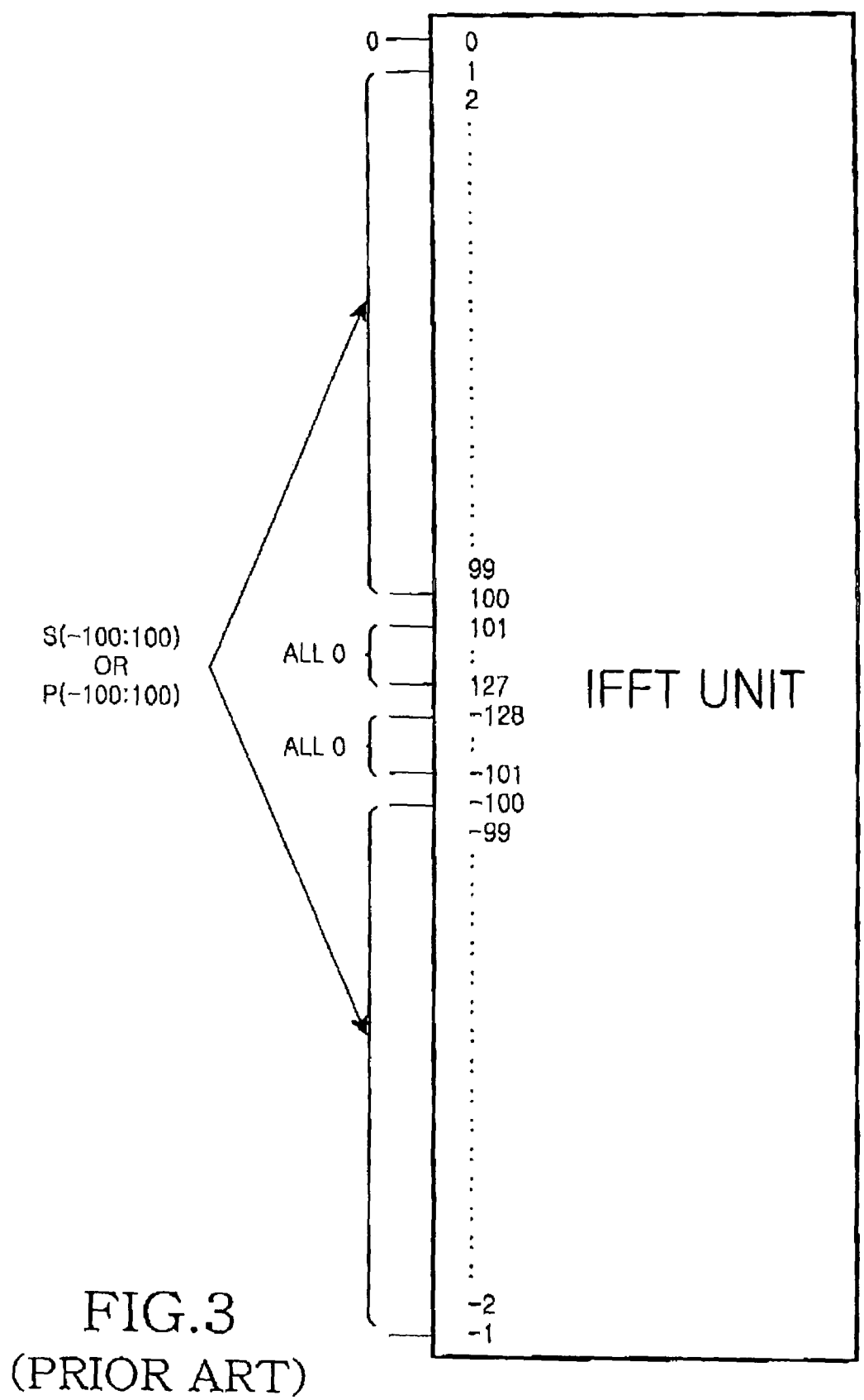
FIG. 3 is a diagram illustrating a mapping relationship between sub-carriers and a preamble sequence when performing IFFT in a conventional OFDM communication system.
Figure 4:
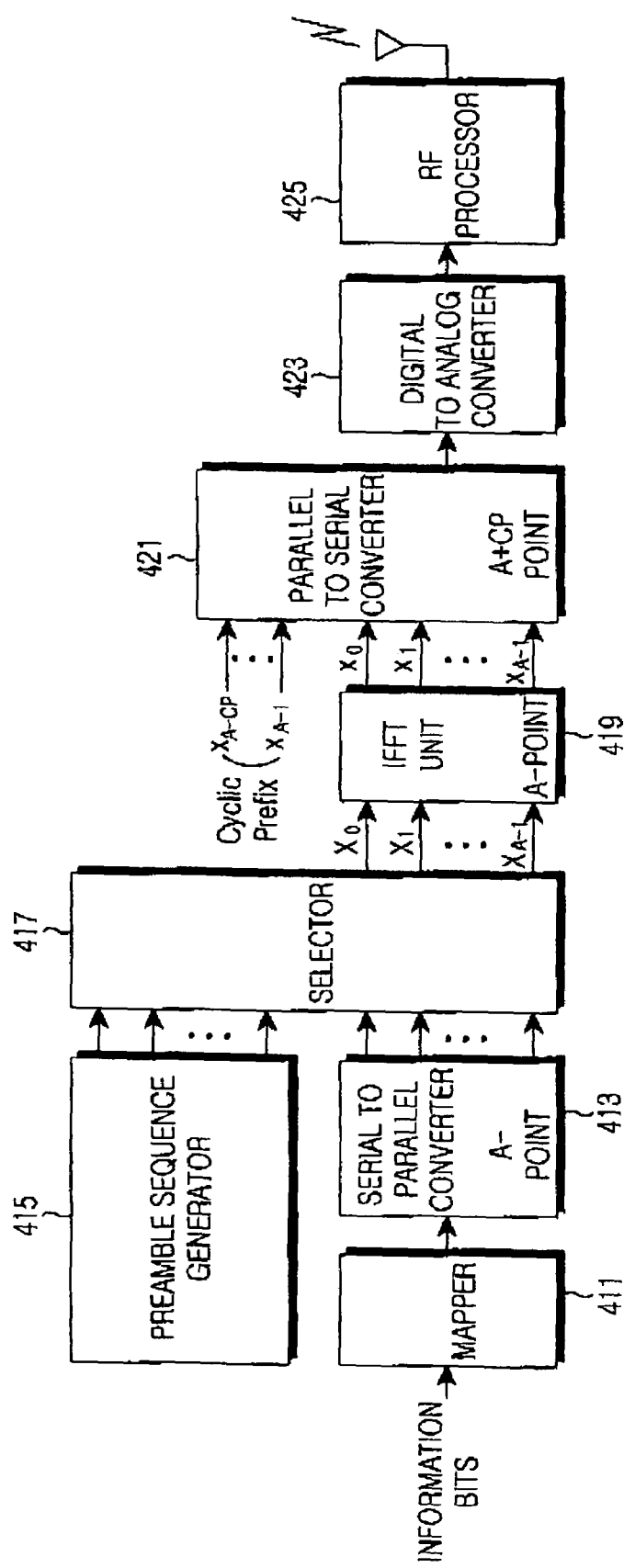
FIG. 4 is a block diagram illustrating a structure of a transmitter of a conventional OFDM communication system.
Figure 5:
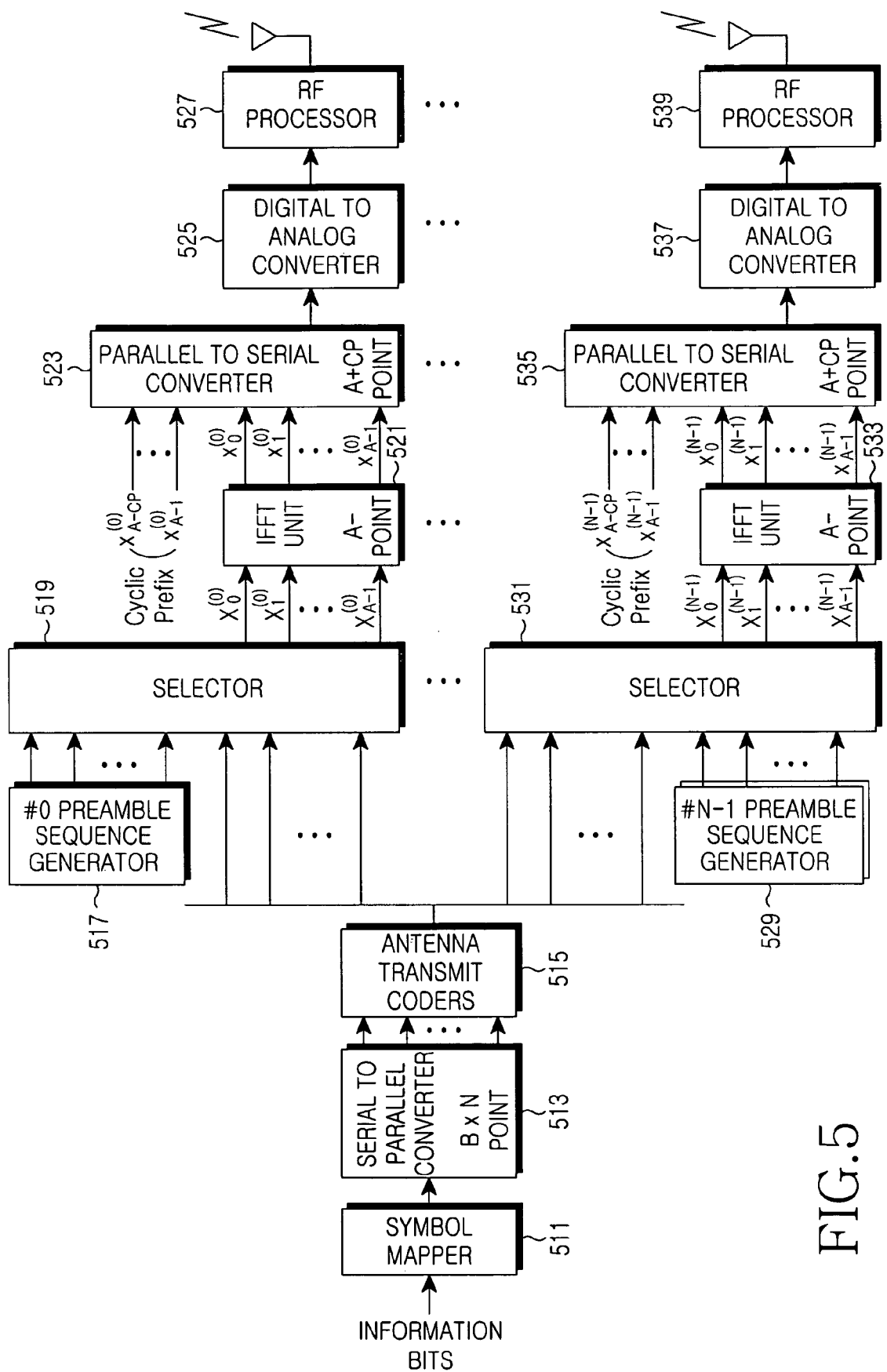
FIG. 5 is a block diagram illustrating a structure of a transmitter of an OFDM communication system according to an embodiment of the present invention.

FIG. 5 is a block diagram illustrating a structure of a transmitter of an OFDM (Orthogonal Frequency Division Multiplexing) communication system according to an embodiment of the present invention.

Referring to FIG. 5, if information bits to be transmitted are generated, the information bits are input into a symbol mapper 511. Upon receiving the information bits, the symbol mapper 511 modulates the information bits into symbols through a predetermined modulation scheme and sends the symbols to a serial-to-parallel converter 513. The predetermined modulation scheme includes a quadrature phase shift keying (QPSK) scheme and a 16 quadrature amplitude modulation (16QAM) scheme. Upon receiving the symbols from the symbol mapper 511, the serial-to-parallel converter 513 converts the symbols such that the symbols match with a B×N point, and sends the symbols to a plurality of antenna transmit coders 515. Herein, B represents the number of sub-carriers in the OFDM communication system except for sub-carriers corresponding to a guard band, that is, except for a #0 sub-carrier and sub-carriers corresponding to a high frequency band in a frequency domain, which represent DC components at a time domain, that is, at a reference point of the preamble sequence. N represents the number of transmit antennas used in the OFDM communication system.

The antenna transmit coders 515 can be implemented with a space-time coder and a data multiplexer. If the antenna transmit coder 515 is used for obtaining transmit antenna diversity, the antenna transmit coder 515 is implemented with the space-time coder. In addition, if the antenna transmit coder 515 is used for increasing the data capacity, the antenna transmit coder 515 is implemented with the data multiplexer. Signals output from the antenna transmit coders 515 are input into selectors 519 to 531. The number of the selectors is equal to the number of transmit antennas. That is, N selectors are provided.

In addition, a preamble sequence generator 517 for a #0 transmit antenna generates the preamble sequence under the control of a controller (not shown) and sends the preamble sequence to the selector 519. In this manner, a preamble sequence generator 529 for a #N−1 transmit antenna, which is a final transmit antenna, generates the preamble sequence under the control of the controller and sends the preamble sequence to the selector 531. The operation of the preamble sequence generators 517 to 529 will be described later, so it will be omitted here in order to avoid redundancy. The selector 519 selects a signal output from the antenna transmit coders 515 or a signal output from the preamble sequence generator 517 according to a predetermined scheduling scheme and sends the signal to an inverse fast Fourier transformer (hereinafter, referred to as IFFT unit) 521. The signals output from the selector 519 are input into the IFFT unit 521 while being mapped on a one-to-one basis with inputs of the IFFT unit 521 corresponding to the #0 transmit antenna. Although it is not illustrated in FIG. 5 in detail, the number of preamble sequence generators is equal to the number of selectors. For illustration purposes, the preamble sequence generator 517 and the selector 519 corresponding to the #0 transmit antenna and the preamble sequence generator 529 and the selector 531 corresponding to the #N−1 transmit antenna are illustrated in FIG. 5.

The selector 519 selects the preamble sequence output from the preamble sequence generator 517 or the signals output from the antenna transmit coders 515 and sends the preamble sequence or the signals to the IFFT unit 521 according to the above selection. Upon receiving the preamble sequence or the signals, the IFFT unit 521 performs A-point IFFT and sends the preamble sequence or the signal to a parallel-to-serial converter 523. In addition, the parallel-to-serial converter 523 also receives a cyclic prefix signal having a predetermined length. The "cyclic prefix" signal is a guard interval signal. The guard interval signal can be inserted into data through a "cyclic prefix scheme", in which predetermined number of end samples of the OFDM symbols in the time domain are copied and inserted into effective OFDM symbols, or a "cyclic postfix" scheme, in which predetermined number of beginning samples of the OFDM symbols in the time domain are copied and inserted into effective OFDM symbols. Sizes of the beginning and end samples used in the cyclic prefix scheme and the cyclic postfix scheme are predetermined in the OFDM communication system. According to the present invention, the guard interval signals are inserted into the data through the cyclic prefix scheme. The parallel-to-serial converter 523 converts the signal output from the IFFT unit 521 and the cyclic prefix signal into serial signals, and sends the serial signals to a digital-to-analog converter 525. Upon receiving the serial signals from the parallel-to-serial converter 523, the digital-to-analog converter 525 converts the serial signals into analog signals and sends the analog signals to an RF (radio frequency) processor 527. The RF processor 527 includes a filter and a front end unit (not shown). The RF processor 527 processes the analog signals output from the digital-to-analog converter 525 such that the signals can be transmitted through the air and sends the signals through the #0 transmit antenna.

In this manner, the preamble sequence generator 529 for the #N−1 transmit antenna generates the preamble sequence under the control of the controller and sends the preamble sequence to the selector 531. In addition, the selector 531 selects the signals output from the antenna transmit coders 515 or the signal output from the preamble sequence generator 529 according to a predetermined scheduling scheme and sends the signal to an IFFT unit 533. The signals output from the selector 531 are input into an IFFT unit 533 while being mapped on a one-to-one basis with inputs of the IFFT unit 533 corresponding to the #N−1 transmit antenna.

The selector 531 selects the preamble sequence output from the preamble sequence generator 529 or the signals output from the antenna transmit coders 515 and sends the preamble sequence or the signals to the IFFT unit 533 according to the above selection. Upon receiving the preamble sequence or the signals, the IFFT unit 533 performs A-point IFFT and sends the preamble sequence or the signal to a parallel-to-serial converter 535. The parallel-to-serial converter 535 also receives a cyclic prefix signal having a predetermined length. Thus, the parallel-to-serial converter 535 converts the signal output from the IFFT unit 533 and the cyclic prefix signal into serial signals and sends the serial signals to a digital-to-analog converter 537. Upon receiving the serial signals from the parallel-to-serial converter 535, the digital-to-analog converter 537 converts the serial signals into analog signals and sends the analog signals to an RF processor 539. The RF processor 539 includes a filter and a front end unit (not shown). The RF processor 539 processes the analog signals output from the digital to analog converter 537 such that the signals can be transmitted through air and sends the signals through the transmit antenna.

Hereinafter, a preamble sequence generator capable of minimizing interference between base stations (that is, inter-cell interference) in a cellular OFDM communication system according to an embodiment of the present invention will be described with reference to FIG. 6.

Figure 6:
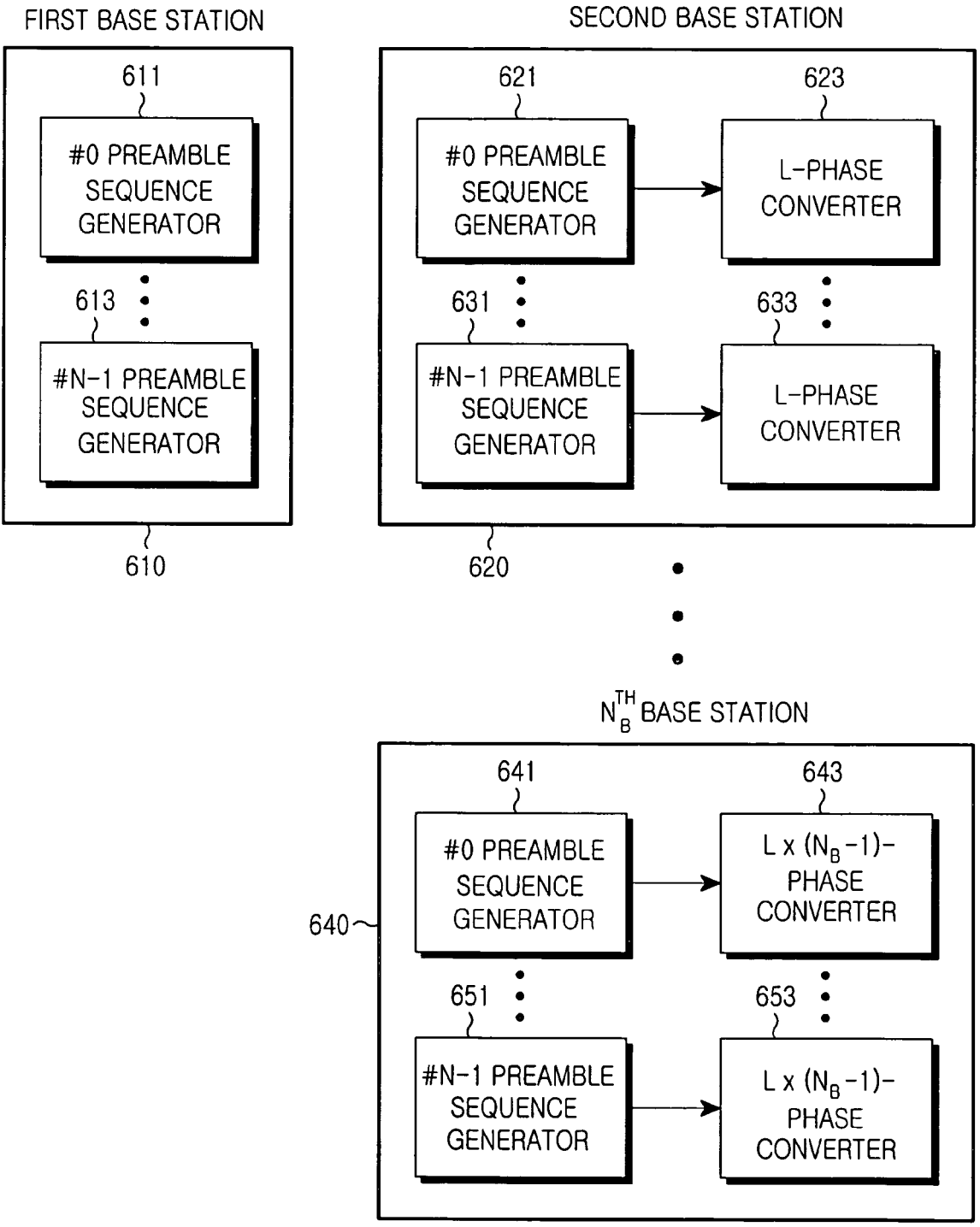
FIG. 6 is a block diagram illustrating a preamble sequence mapping rule between base stations in a cellular OFDM communication system according to an embodiment of the present invention.

FIG. 6 is a block diagram illustrating a preamble sequence generator of each base station in a cellular OFDM communication system according to an embodiment of the present invention.

$N_B$ base stations including a first base station to an $N_B^{th}$ base station are provided in the cellular OFDM communication system and the first base station becomes a reference base station. In addition, each of the $N_B$ base stations includes N transmit antennas including a #0 transmit antenna to a #N−1 transmit antenna.

Referring to FIG. 6, a preamble sequence generator unit 610 of the first base station includes #0 to #N−1 preamble sequence generators 611 to 613 for generating preamble sequences with regard to #0 to #N−1 transmit antennas. The preamble sequence may include a Golay complementary sequence or a complex Golay complementary sequence in order to minimize the peak to average power ratio (PAPR). In addition, in order to ensure orthogonality between the N transmit antennas, the preamble sequences transmitted through the N transmit antennas can employ different sub-carriers. That is, the preamble sequences generated from the #0 to #N−1 preamble sequence generators 611 to 613 are identical to each other, but positions of the sub-carriers for the preamble sequences are different from each other. In addition, the preamble sequence generated from the reference base station is referred to as a "reference preamble sequence". The present invention does not directly relate to the use of different sub-carriers for ensuring orthogonality between N transmit antennas, so it will not be further described below. In the following description, it is assumed that the base stations, except for the first base station, include N transmit antennas and transmission of the preamble sequence between the N transmit antennas is carried out in the same manner as in the first base station.

The phases of the preamble sequences generated from the non-reference base stations are shifted from the phase of the preamble sequence of the reference base station by a predetermined degree. A preamble sequence generator unit 620 of a second base station includes #0 to #N−1 preamble sequence generators 621 to 631 for generating preamble sequences with regard to the #0 to #N−1 transmit antennas, and a plurality of L-phase converters 623 to 633 connected to the #0 to #N−1 preamble sequence generators 621 to 631, respectively.

The #0 to #N−1 preamble sequence generators 621 to 631 generate preamble sequences equal to the preamble sequences generated from #0 to #N−1 preamble sequence generators 611 to 613. The base stations of the OFDM communication system may generate preamble sequences identical to each other. In addition, non-reference base stations perform a phase shift with regard to the preamble sequences of each transmit antenna, thereby minimizing interference between the cells. In addition, each of $N_B$ base stations may recognize its own base station identifier (BS ID) and the phase information to be shifted from the phase of the preamble sequences generated from the reference base station. The information related to the BS ID and phase is preset in the base stations when designing the cellular OFDM communication system. Therefore, each of the base stations forming the cellular OFDM communication system can discriminate preamble sequences of other base stations from its own preamble sequence.

The L-phase converters 623 to 633 convert phases of the preamble sequences generated from the #0 to #N−1 preamble sequence generators 621 to 631 and output the phase-shifted preamble sequences as preamble sequences of the second base station. L represents the maximum number of multi-paths in the cellular OFDM communication system. In general, L is defined within the length of the cyclic prefix. That is, L has a value in a range of 1 to the length of the cyclic prefix. The preamble sequence must be generated by taking the maximum number of multi-paths into consideration in order to generate the preamble sequences of the other cells on the basis of the multi-paths for the preamble sequences transmitted through the transmit antennas.

In addition, a preamble sequence generator unit 640 of an $N_B$ base station includes #0 to #N−1 preamble sequence generators 641 to 651 for generating preamble sequences with regard to #0 to #N−1 transmit antennas, and a plurality of $L \times (N_B-1)$ phase converters 643 to 653 connected to the #0 to #N−1 preamble sequence generators 641 to 651, respectively. The #0 to #N−1 preamble sequence generators 641 to 651 generate preamble sequences equal to the preamble sequences generated from the #0 to #N−1 preamble sequence generators 611 to 613. The $L \times (N_B-1)$ phase converters 643 to 653 shift phases of the preamble sequences generated from the #0 to #N−1 preamble sequence generators 641 to 651 by a degree of $L \times (N_B-1)$, and output the phase-shifted preamble sequences as preamble sequences of the $N_B$ base station. The reference base station and the non-reference base stations know their own BS ID and shift a phase of a reference preamble sequence corresponding to the BS ID. That is, the first base station, which is the reference base station, outputs the reference preamble sequence without shifting the phase of the reference preamble sequence. However, the second base station, which is the first non-reference base station, outputs the reference preamble sequence while shifting the phase of the reference preamble sequence by a degree of L, and the third base station, which is the second non-reference base station, outputs the reference preamble sequence while shifting the phase of the reference preamble sequence by a degree of L×2. In this manner, the $N_B$ base station, which is a final non-reference base station, outputs the reference preamble sequence while shifting the phase of the reference preamble sequence by a degree of $L \times (N_B-1)$.

Although the first base station 610 shown in FIG. 6 is only equipped with #0 to #N−1 preamble sequence generators 611 to 613 for the #0 to #N−1 transmit antennas, the first base station 610 can include the phase converter identical to the phase converters provided in the non-reference base stations.

In this case, the phase converter allows the reference base station to output the reference preamble sequence and allows the non-reference base stations to output the phase-shifted preamble sequence by shifting the phase of the preamble sequence by a predetermined degree.

As described above with reference to FIG. 6, the preamble sequence of the $N_B$ base station is output while being phase-shifted by $L \times (N_B-1)$ as compared with the phase of the preamble sequence of the first base station. In this manner, interference between neighbor cells can be minimized by shifting the phases of the preamble sequences of the neighbor cells.

FIG. 7 is a block diagram illustrating the internal structure of the L-phase converter 623 shown in FIG. 6.

Prior to explaining FIG. 7, it is noted that other phase converters shown in FIG. 6 may operate in the same manner as the L-phase converter 623, so the L-phase converter 623 is described with reference to FIG. 7 as an example.

Referring to FIG. 7, a preamble sequence having a length A and being generated from the preamble sequence generator 621 is represented as $$\begin{bmatrix} X_0 \\ X_1 \\ \vdots \\ X_{A-1} \end{bmatrix}.$$

In addition, each element of the preamble sequence $$\begin{bmatrix} X_0 \\ X_1 \\ \vdots \\ X_{A-1} \end{bmatrix}$$

can be output as an L-phase shifted preamble sequence $$\begin{bmatrix} Y_0 \\ Y_1 \\ \vdots \\ Y_{A-1} \end{bmatrix}$$

through Equation 1.

$$Y_k = e^{j\frac{2\pi L k}{A}} X_k \quad (1)$$

In Equation 1, k is a (k+1)th element forming the preamble sequence, and L is a maximum number of multi-paths in the OFDM communication system. As described above, the preamble sequence of the reference base station is phase-shifted in the non-reference base stations due to following reasons.

First, the preamble sequence must be phase-shifted in the frequency domain because a circular shift effect may occur in a time domain. In general, if the cyclic prefix signal, that is, the guard interval signal is used in the OFDM communication system, multi-path signals are circularly shifted from original time domain signals. In addition, due to the IFFT characteristic, orthogonality is ensured between the circularly shifted time domain signals. Accordingly, orthogonality is ensured between the preamble sequence transmitted from the reference base station and the phase-shifted preamble sequence, thereby minimizing interference between neighbor cells.

Therefore, in Equation 1, if the neighbor base stations use the phase-shifted preamble sequence by shifting the phase of the preamble sequence of the reference base station by a degree of L, interference between the reference base station and the neighbor base stations can be minimized. In the OFDM communication system, the length of the cyclic prefix signal is greater than the maximum number L of the multi-paths. Thus, if it is impossible to precisely find the maximum number L of the multi-paths, the maximum number L of the multi-paths shown in Equation 1 can be replaced by the length of the cyclic prefix signal. In addition, Equation 1 can be represented in the form of a matrix as shown in Equation 2.

$$\begin{bmatrix} 1 & 0 & \ldots & 0 \\ 0 & e^{j\frac{2\pi L}{A}} & \ldots & 0 \\ . & . & \ldots & . \\ 0 & 0 & \ldots & e^{j\frac{2\pi(A-1)L}{A}} \end{bmatrix} \quad (2)$$

Hereinafter, a preamble sequence mapping rule between two base stations will be described when the cellular OFDM communication system includes first and second base stations having four transmit antennas and 32 multi-paths.

Figure 8:
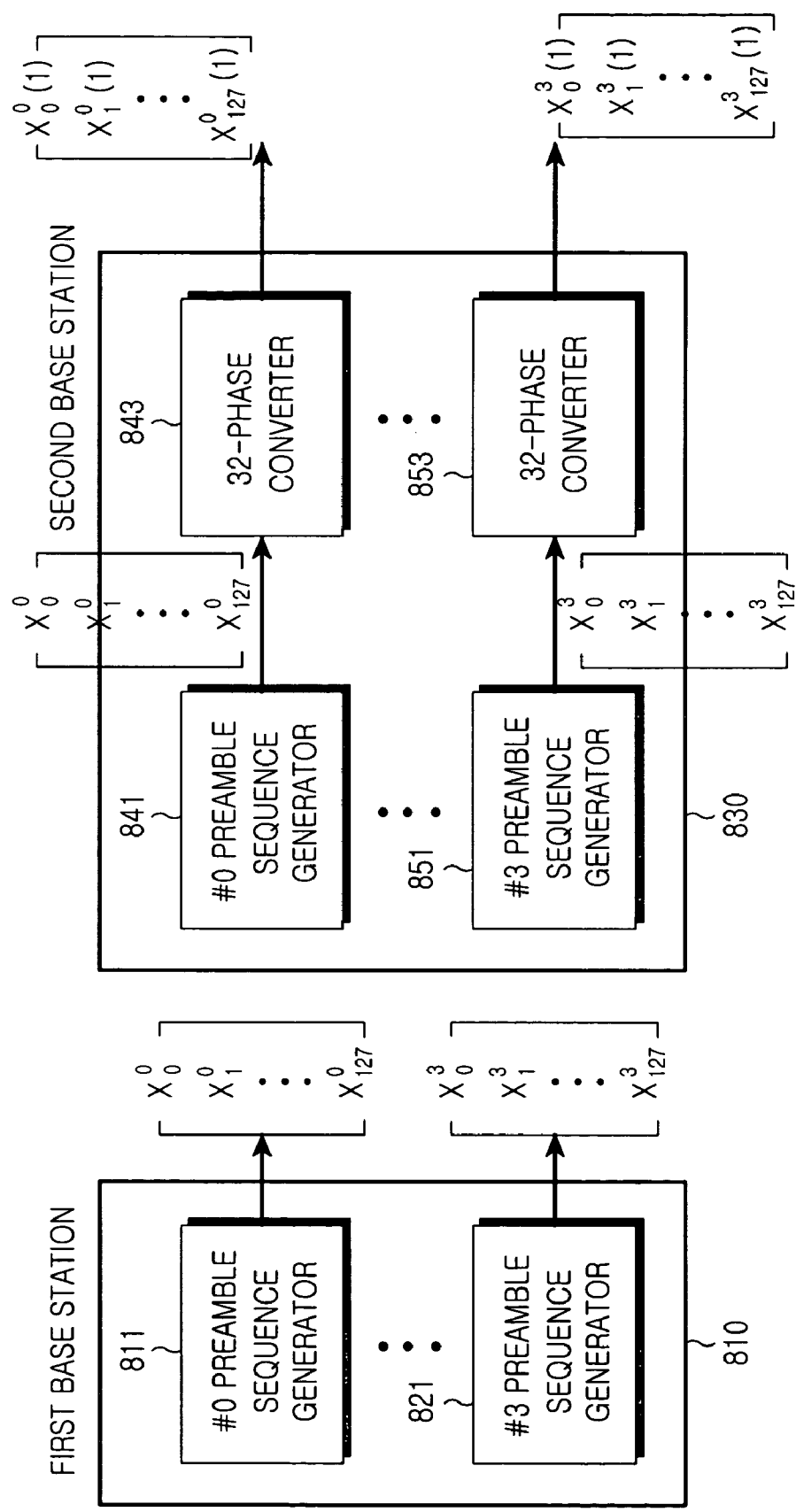
FIG. 8 is a block diagram illustrating a preamble sequence mapping rule between two base stations having four transmit antennas in a cellular OFDM communication system according to an embodiment of the present invention.

FIG. 8 is a block diagram illustrating a preamble sequence mapping rule between two base stations having four transmit antennas in the cellular OFDM communication system according to an embodiment of the present invention.

The cellular OFDM communication system employs 128 sub-carriers including #−64 to #63 sub-carriers, and 104 sub-carriers including #−52 to #−1 and 1 to #52 sub-carriers are actually used. That is, from among the 128 sub-carriers, 104 sub-carriers except for a #0 sub-carrier, #−64 to #−53 sub-carriers, and #53 to #63 sub-carriers are actually used. When the #0 sub-carrier, #−64 to #−53 sub-carriers, and #53 to #63 sub-carriers are transmitted, null data, that is zero data, are inserted into the sub-carriers due to following reasons. First, the null data are inserted into the $0^{th}$ sub-carrier because the #0 sub-carrier represents the DC component at a reference point of the preamble sequence, that is in a time domain, after the IFFT has been carried out. In addition, the null data is inserted into 12 sub-carriers including #−64 to #−53 sub-carriers and 11 sub-carriers including #53 to #63 sub-carriers in order to insert a guard interval in a frequency domain because the above sub-carriers correspond to a high frequency band in the frequency domain.

Referring to FIG. 8, a preamble sequence generator unit 810 of the first base station (that is, the reference base station) includes #0 to #3 preamble sequence generators 811 to 821 for generating preamble sequences with regard to #0 to #3 transmit antennas, respectively. Herein, the preamble sequence generated from the #0 preamble sequence generator 811 with regard to the #0 transmit antenna is represented as $$\begin{bmatrix} X_0^0 \\ X_1^0 \\ \vdots \\ X_{127}^0 \end{bmatrix}.$$

and the preamble sequence generated from the #3 preamble sequence generator 821 with regard to the #3 transmit antenna is represented as $$\begin{bmatrix} X_0^3 \\ X_1^3 \\ \vdots \\ X_{127}^3 \end{bmatrix}.$$

In addition, a preamble sequence generator unit 830 of a second base station includes #0 to #3 preamble sequence generators 841 to 851 for generating preamble sequences with regard to #0 to #3 transmit antennas, and a plurality of 32-phase converters 843 to 853 for shifting the phases of the preamble sequences generated from the #0 to #3 preamble sequence generators 841 to 851 by a phase shift of 32 degrees. The #0 to #3 preamble sequence generators 841 to 851 generate preamble sequences equal to the preamble sequences generated from #0 to #3 preamble sequence generators 811 to 821.

The 32-phase converter 843 receives the preamble sequence from the #0 preamble sequence generator 841 and outputs the preamble sequence by shifting the phase of the preamble sequence according to Equation 1. In the same manner, the 32-phase converter 853 receives the preamble sequence from the #3 preamble sequence generator 851 and outputs the preamble sequence by shifting the phase of the preamble sequence according to Equation 1. Herein, the preamble sequence output from the 32-phase converter 843 with regard to the #0 transmit antenna is represented as $$\begin{bmatrix} X_0^0(1) \\ X_1^0(1) \\ \vdots \\ X_{127}^0(1) \end{bmatrix},$$

and the preamble sequence output from the 32-phase converter 853 with regard to the #3 transmit antenna is represented as $$\begin{bmatrix} X_0^3(1) \\ X_1^3(1) \\ \vdots \\ X_{127}^3(1) \end{bmatrix}.$$

FIG. 9 is a block diagram illustrating the internal structure of the 32-phase converter shown in FIG. 8.

Prior to explaining FIG. 9, it is noted that other phase converters shown in FIG. 8 may operate in the same manner as the L-phase converter 843, so the L-phase converter 843 is described with reference to FIG. 9 as an example.

Referring to FIG. 9, a preamble sequence having a 128-length and generated from the #0 preamble sequence generator 841 is represented as $$\begin{bmatrix} X_0 \\ X_1 \\ \vdots \\ X_{127} \end{bmatrix}.$$

In addition, each element of the preamble sequence $$\begin{bmatrix} X_0 \\ X_1 \\ \vdots \\ X_{127} \end{bmatrix}$$

is output as a 32-phase shifted preamble sequence $$\begin{bmatrix} Y_0 \\ Y_1 \\ \vdots \\ Y_{127} \end{bmatrix}$$

through Equation 3.

$$Y_k = e^{j\frac{2\pi 32k}{A}} X_k \qquad (3)$$

In addition, Equation 3 can be represented in the form of a matrix as shown in Equation 4.

$$\begin{bmatrix} 1 & 0 & \cdots & 0 \\ 0 & e^{j\frac{2\pi \times 1 \times 32}{128}} & \cdots & 0 \\ \vdots & \vdots & \cdots & \vdots \\ 0 & 0 & \cdots & e^{j\frac{2\pi \times 127 \times 32}{128}} \end{bmatrix} \qquad (4)$$

Figure 10:
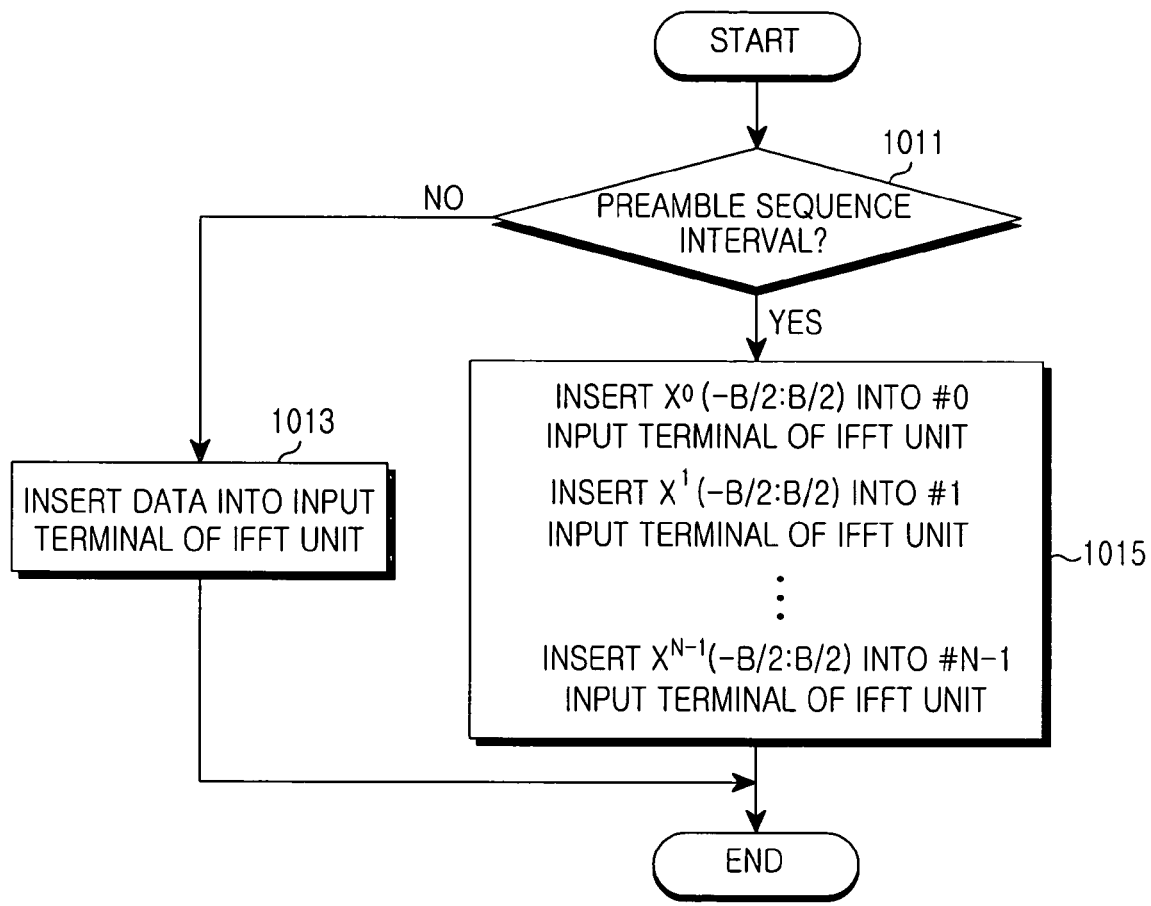
FIG. 10 is a flowchart illustrating a preamble sequence mapping procedure according to an embodiment of the present invention.

FIG. 10 is a flowchart illustrating a preamble sequence mapping procedure according to an embodiment of the present invention.

Referring to FIG. 10, the reference base station determines if the signal interval is a preamble sequence transmission interval (step 1011). If the signal interval is not the preamble sequence transmission interval, that is, if the signal interval is a data transmission interval, step 1013 is carried out. In step 1013, the reference base station controls data to be transmitted such that data is mapped to the sub-carriers at an input terminal of the IFFT unit.

If it is determined in step 1011 that the signal interval is the preamble sequence transmission interval, step 1015 is carried out. In step 1015, the reference base station maps $X^0(-B/2:B/2)$ into an input terminal of the IFFT unit corresponding to the #0 transmit antenna, and maps $X^1(-B/2:B/2)$ into an input terminal of the IFFT unit corresponding to the #1 transmit antenna. In this manner, the reference base station maps $X^{N-1}(-B/2:B/2)$ into an input terminal of the IFFT unit corresponding to the #N−1 transmit antenna. Herein, B represents the number of sub-carriers which are actually used when A input terminals are used in the OFDM communication system, that is, when the IFFT unit is an A-point IFFT unit.

Figure 11:
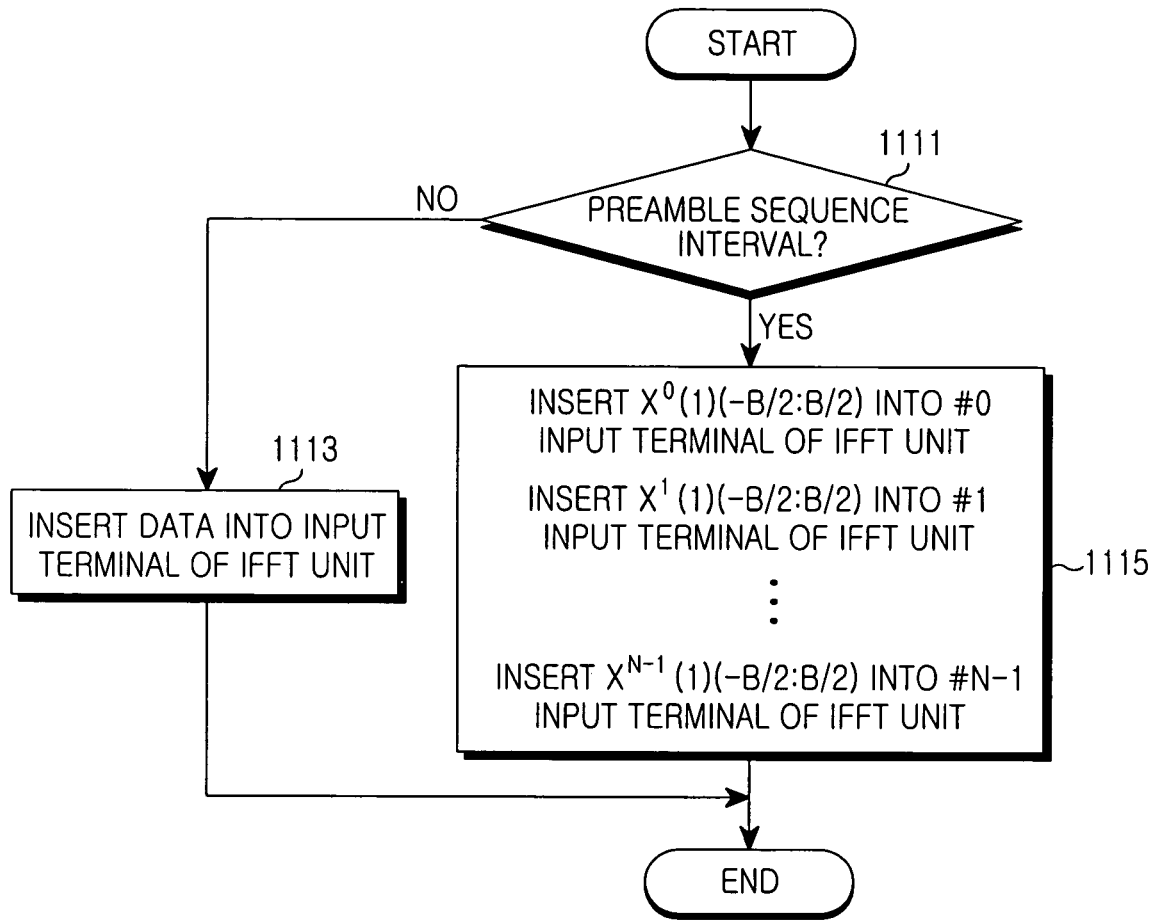
FIG. 11 is a flowchart illustrating a preamble sequence mapping procedure of a non-reference base station according to an embodiment of the present invention.

FIG. 11 is a flowchart illustrating a preamble sequence mapping procedure of a non-reference base station according to an embodiment of the present invention.

The following description will be made on the assumption that the non-reference base station is the second base station. Referring to FIG. 11, the non-reference base station determines if the signal interval is a preamble sequence transmission interval (step 1111). If the signal interval is not the preamble sequence transmission interval, that is, if the signal interval is a data transmission interval, step 1113 is carried out. In step 1113, the non-reference base station controls data to be transmitted such that data is mapped to the sub-carriers at an input terminal of the IFFT unit.

If it is determined in step 1111 that the signal interval is the preamble sequence transmission interval, step 1115 is carried out. In step 1115, the non-reference base station maps $X^0(1)$ (−B/2:B/2) into an input terminal of the IFFT unit corresponding to the #0 transmit antenna, and maps $X^1(1)(-B/2:B/2)$ into an input terminal of the IFFT unit corresponding to the #1 transmit antenna. In this manner, the non-reference base station maps $X^{N-1}(1)(-B/2:B/2)$ into an input terminal of the IFFT unit corresponding to the #N−1 transmit antenna.

Although the present invention has been described in relation to the base stations having a plurality of transmit antennas, the method for generating the preamble sequence of the present invention is also applicable for a base station having one transmit antenna in order to minimize interference between neighbor cells.

The method for generating the preamble sequence of the present invention has following advantages.

First, each of the base stations of the cellular OFDM communication system uses the same preamble sequence while varying the phase of the preamble sequence, so the preamble sequence of the present invention can be efficiently utilized during a handoff. In addition, since each of the base stations of the cellular OFDM communication system has phase shift information of other base stations, one base station can discriminate its own preamble sequence from preamble sequences of other base stations. Accordingly, the base station can perform channel estimation by using preamble sequences transmitted thereto from other base stations and can measure intensity of the signals transmitted thereto from other base stations through the channel estimation. The signal intensity of other base stations can be efficiently utilized in order to select the base station during the handoff.

As described above, the present invention can generate a preamble sequence capable of minimizing the interference between neighbor cells and can transmit and receive the preamble sequence in a cellular OFDM communication system. Since the preamble sequence can minimize the interference between neighbor cells, performance of the cellular OFDM communication system can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for generating a preamble sequence in an orthogonal frequency division multiplexing (OFDM) communication system including a reference base station and a plurality of non-reference base stations and employing m sub-carriers in a frequency domain, the method comprising the steps of:

generating a reference preamble sequence having a length equal to n and mapped on a one-to-one basis with n sub-carriers of the m sub-carriers; and generating, at a base station, a final preamble sequence when the base station is a reference base station, and shifting a phase of the reference preamble sequence by a predetermined phase in order to generate a phase-shifted final preamble sequence when the base station is a non-reference base station, wherein elements of the final preamble sequence are mapped on a one-to-one basis with n sub-carriers, null data are mapped on a one-to-one basis with remaining sub-carriers that exclude the n sub-carriers of the m sub-carriers, inverse fast Fourier transform (IFFT) is performed with regard to the sub-carriers in order to transform the sub-carriers into time domain data, and the predetermined phase is based on a number of multi-paths and a number of the non-reference base stations used in the OFDM communication system.

2. The method as claimed in claim 1, wherein the predetermined phase is based on a length of a guard interval.

3. A method for generating a preamble sequence in an orthogonal frequency division multiplexing (OFDM) communication system including a reference base station and a plurality of non-reference base stations and employing m sub-carriers in a frequency domain and k transmit antennas, the method comprising the steps of:

generating a reference preamble sequence having a length equal to m/k and mapped on a one-to-one basis with in/k sub-carriers; and generating, at a base station, a final preamble sequence when the base station is a reference base station, and shifting a phase of the reference preamble sequence by a predetermined phase in order to generate a phase-shifted final preamble sequence when the base station is a non-reference base station, wherein elements of the final preamble sequence are mapped on a one-to-one basis with the in/k sub-carriers, null data are mapped on a one-to-one basis with remaining sub-carriers that exclude the n sub-carriers of the in sub-carriers, inverse fast Fourier transform (IFFT) is performed with regard to the sub-carriers in order to transform the sub-carriers into time domain data, and the predetermined phase is based on a number of multi-paths and a number of the non-reference base stations used in the OFDM communication system.

4. The method as claimed in claim 2, wherein the predetermined phase is based on a length of a guard interval.

5. An apparatus for generating a preamble sequence in an orthogonal frequency division multiplexing (OFDM) communication system including a reference base station and a plurality of non-reference base stations and employing m sub-carriers in a frequency domain, the apparatus comprising:

a reference preamble sequence generator for generating a reference preamble sequence having a length equal to n and mapped on a one-to-one basis with n sub-carriers of the m sub-carriers;

a phase converter for shifting a phase of the reference preamble sequence by a predetermined phase to allow a base station to generate a phase-shifted final preamble sequence when the base station is a non-reference base station; and an inverse fast Fourier transformer capable of mapping on a one-to-one basis elements of the final preamble sequence with the n sub-carriers, mapping on a one-to-one basis null data with remaining sub-carriers of in sub-carriers, and performing inverse fast Fourier transform (IFFT) with regard to the sub-carriers in order to transform the sub-carriers into time domain data, wherein the predetermined phase is based on a number of multi-paths and a number of the non-reference base stations used in the OFDM communication system.

6. The apparatus as claimed in claim 5, wherein the predetermined phase is based on a length of a guard interval.

7. An apparatus for generating a preamble sequence in an orthogonal frequency division multiplexing (OFDM) communication system including a reference base station and a plurality of non-reference base stations and employing m sub-carriers in a frequency domain and k transmit antennas, the apparatus comprising:

a reference preamble sequence generator for generating a reference preamble sequence having a length equal to ni/k and mapped on a one-to-one basis with in/k sub-carriers;

a phase converter for shifting a phase of the reference preamble sequence by a predetermined phase to allow a base station to generate a phase-shifted final preamble sequence when the base station is a non-reference base station; and an inverse fast Fourier transformer capable of mapping on a one-to-one basis elements of the final preamble sequence with the m/k sub-carriers, mapping on a one-to-one basis null data with remaining sub-carriers of m sub-carriers, and performing inverse fast Fourier transform (IFFT) with regard to the sub-carriers in order to transform the sub-carriers into time domain data, wherein the predetermined phase is based on a number of multi-paths and a number of the non-reference base stations used in the OFDM communication system.

8. The apparatus as claimed in claim 7, wherein the predetermined phase is based on a length of a guard interval.

* * * * *